R. C. Archibald,
Cider Mill.

Nº 68,145. Patented Aug. 27, 1867.

Witnesses.

Inventor.
R. C. Archibald
by
D. P. Holloway & Co
his attorneys

United States Patent Office.

ROBERT C. ARCHIBALD, OF LAFAYETTE, INDIANA.

Letters Patent No. 68,145, dated August 27, 1867.

IMPROVEMENT IN CIDER-MILLS.

*The Schedule referred to in these Letters Patent and making part of the same.*

TO ALL WHOM IT MAY CONCERN:

Be it known that I, ROBERT C. ARCHIBALD, of Lafayette, in the county of Tippecanoe, and State of Indiana, have invented a new and useful Improvement in Cider-Mills; and I do hereby declare that the following is a full, clear, and exact description of the same, reference being made to the annexed drawings, made part of this specification, in which—

Figure 1:
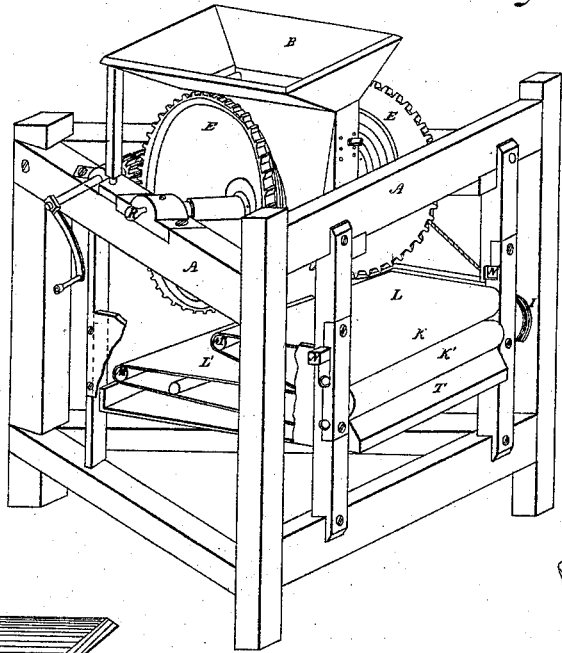
Figure 3:
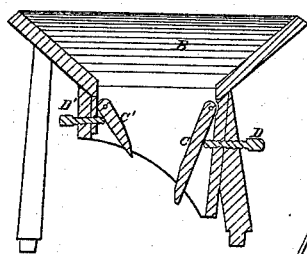
Figure 4:
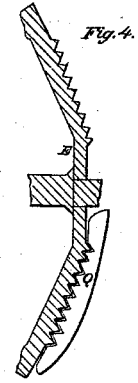
Figure 2:
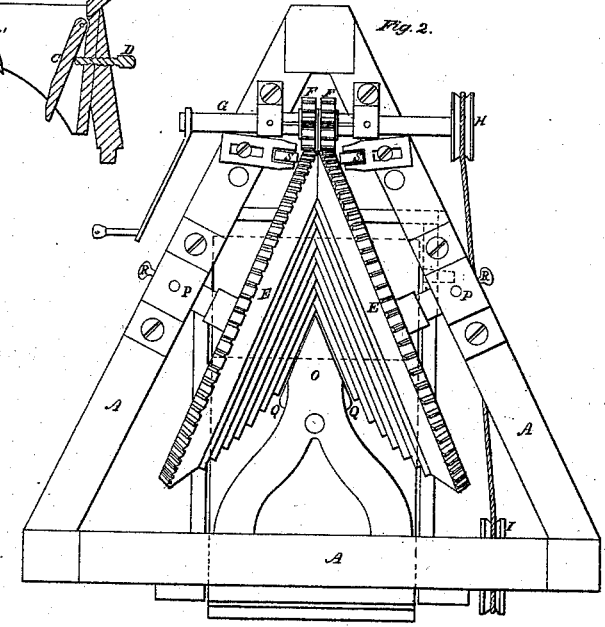

Figure 1 is a perspective view.
Figure 2 is a top view, the hopper being removed.
Figure 3 is a longitudinal vertical section of the hopper; and
Figure 4 is a section of one of the crushing-disks.

In the several figures the same letters refer to identical parts.

A is the frame, which I make triangular, strongly put together so as to sustain properly the machinery. On this frame stands the hopper B, made with converging sides terminating in a throat, the capacity of which is regulated by the hinged pieces C C', against the backs of which rest the points of the set-screws D and D', by which the amount of fruit supplied to the mill may be regulated. E E are conical corrugated disks, turning upon axes which are so set that they will meet where the apices of the cones—of which the disks are frusta—would join, the sides of the cones being in contact. The faces of these disks are cut into a series of concentric circular corrugations, as shown in fig. 4, and they are so arranged that the projections in the one shall fit into the corresponding depressions in the other. The inner end of the journals rests upon the tongue O, which is supported by the frame A, and which also sustains one end of the hopper, and to which the scrapers Q are attached which depend from it. These scrapers are cut with a serrated edge to fit the corrugations upon the conical disks, and extend the entire length of the face of the disk below the journal. The exterior ends of the shafts, upon which the disks are hung, rest upon suitable boxes on the upper timbers of the frame. The journals of these shafts are turned off outside of the boxes, so as to permit a slight lateral play, and the set-screws R R, working through the ends of the boxes, rest against the ends of the shafts, and regulate the distance separating the opposite faces of the disks, as may be required in order to permit the required variety of feed. S S are friction-rollers, adjustably attached to the frame, so as to hold the external parts of the disks from yielding unduly to the outward pressure of the fruit when being crushed. These revolving disks are actuated by the pinions F F, working into teeth cut on the periphery of the disks. The power is applied to the shaft on which these pinions are hung by a crank-handle, or pulley, or gearing, according to the power employed. On the opposite working extremity of this shaft is a pulley, H, connected by a band with the pulley I, which communicates motion to the rollers K' and K. These rollers are made of or faced with India rubber, and have their journals supported by suitable boxes in the frame-posts, the upper one being adjustable by means of the wedges N N', by which the degree of pressure upon one another may be regulated as required. Around each of these rollers passes an endless apron of cloth, L and L', extended by the rollers M and M', around which they are severally carried. The apron L extends but little more than half as far back as the apron L', terminating before reaching the lower ends of the scrapers Q, while the apron L' extends entirely under the disks E E. Below the aprons I place the trough T, the front of which extends nearly up to the roller K', but not so as to touch it, and it is set so as to stand slightly back of the front of the roller.

This mill is suitable for grinding and pressing all kinds of fruit.

The throat having been adjusted as required, according to the fruit, and also the conical disks, the fruit passing between the corrugated faces is thoroughly crushed. The pomace and juice falling upon the apron L', the juice passes through the cloth into the trough T, while the pomace is carried by the revolution of the apron between the rollers K and K', which, being pressed together by the wedges N and N', the complete extraction of the juice is perfected, the juice passing through the cloth, while the pomace is discharged over the front of the trough T.

Having fully described the operation and construction of my improved cider-mill, what I claim as my invention, and seek to secure by Letters Patent, is—

The double endless apron L L', in combination with the rollers K K', constructed and arranged to operate substantially as set forth.

In testimony whereof I have signed my name to this specification in the presence of two subscribing witnesses.

ROBERT C. ARCHIBALD.

Witnesses:
GODLOVE O. BEHM,
JOHN L. MILLER.